US009070284B2

(12) United States Patent
Inokuchi et al.

(10) Patent No.: US 9,070,284 B2
(45) Date of Patent: Jun. 30, 2015

(54) TURBULENCE AVOIDANCE OPERATION ASSIST DEVICE

(75) Inventors: Hamaki Inokuchi, Tokyo (JP); Nobuhiro Yokoyama, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 995 days.

(21) Appl. No.: 12/909,810

(22) Filed: Oct. 21, 2010

(65) Prior Publication Data

US 2011/0172919 A1    Jul. 14, 2011

(30) Foreign Application Priority Data

Jan. 13, 2010    (JP) .................................... 2010-4659

(51) Int. Cl.
*G08G 5/00*    (2006.01)
*G01S 17/95*   (2006.01)

(52) U.S. Cl.
CPC ............... *G08G 5/0039* (2013.01); *G01S 17/95* (2013.01)

(58) Field of Classification Search
CPC ............................. G08G 5/0039; G01S 17/95
USPC ................... 701/3, 4, 14, 411, 415, 519, 301
See application file for complete search history.

(56) References Cited

U.S. PATENT DOCUMENTS

| | | | | |
|---|---|---|---|---|
| 4,812,990 A | * | 3/1989 | Adams et al. | 701/3 |
| 5,047,916 A | * | 9/1991 | Kondo | 700/61 |
| 5,677,842 A | * | 10/1997 | Denoize et al. | 701/301 |
| 6,085,147 A | * | 7/2000 | Myers | 701/528 |
| 6,161,063 A | * | 12/2000 | Deker | 701/4 |

(Continued)

FOREIGN PATENT DOCUMENTS

| | | |
|---|---|---|
| JP | 2003-14845 A | 1/2003 |
| JP | 2007-232695 A | 9/2007 |

OTHER PUBLICATIONS

Inokuchi, H. et al., "Development of an Onboard Doppler Lidar for Flight Safety", Journal of Aircraft, 2009, vol. 46, No. 4, pp. 1411-1415.

(Continued)

*Primary Examiner* — John Q Nguyen
*Assistant Examiner* — Michael Whalen
(74) *Attorney, Agent, or Firm* — Cheng Law Group, PLLC

(57) ABSTRACT

An object of the present invention is to provide a turbulence avoidance operation assist device that automatically generates an optimal trajectory of emergency avoidance and reports this trajectory to a pilot when distant turbulence is detected during an aircraft flight. The turbulence avoidance operation assist device in accordance with the present invention includes: means for detecting the presence of a danger region such as a turbulence region ahead of aircraft in a flight direction; means for representing the danger region as an assembly of rectangular solids when the detection means recognizes the danger region, and generating a flight trajectory by a local optimum solution of an avoidance trajectory using a convex quadratic programming method in which deviation from a reference trajectory is the smallest on the basis of an initial estimation solution obtained by a semidefinite programming method; and means for reporting the flight trajectory to a pilot.

8 Claims, 10 Drawing Sheets

(56) References Cited

U.S. PATENT DOCUMENTS

| | | | |
|---|---|---|---|
| 6,173,219 B1 * | 1/2001 | Deker | 701/3 |
| 6,269,301 B1 * | 7/2001 | Deker | 701/411 |
| 6,751,532 B2 | 6/2004 | Inokuchi | |
| 7,493,197 B2 * | 2/2009 | Bitar et al. | 701/14 |
| 7,698,058 B2 * | 4/2010 | Chen et al. | 701/448 |
| 8,090,526 B2 * | 1/2012 | Marty et al. | 701/411 |

OTHER PUBLICATIONS

Frazzoli, E. et al.: "Resolution of Conflicts Involving Many Aircraft via Semidefinite Programming", Journal of Guidance, Control, and Dynamics, 2001, vol. 24, No. 1, pp. 79-86.

Yokoyama, Nobuhiro et al., "Real-Time Trajectory Generation Algorithm for Optimal Avoidance of Turbulence", 47th Aircraft Symposium, Nov. 4, 2009.

* cited by examiner

TURBULENCE AVOIDANCE OPERATION ASSIST DEVICE

BACKGROUND OF THE INVENTION

1. Field of the Invention

The present invention relates to a turbulence avoidance operation assist device by which a pilot is notified of an optimal trajectory for emergency avoidance when a dangerous state such as turbulence is detected in a distant region at a distance of about 20 km ahead of an aircraft in flight. Turbulence represents a typical dangerous state, but the present invention can be also applied in the case of ice crystals or volcano ash.

2. Description of the Related Art

Turbulence has recently attracted attention as a main cause of aircraft accidents, and a Doppler lidar using a laser beam has been researched and developed as an airborne device that detects turbulence in advance (see, for example, Japanese Patent Application Laid-open No. 2003-014845 "Wind Terbulence Prediction System", Jan. 15, 2003, and H. Inokuchi, H. Tanaka, and T. Ando, "Development of an Onboard Doppler LIDAR for Flight Safety," Journal of Aircraft, Vol. 46, No. 4, pp. 1411-1415, AIAA, July-August 2009). Lidar is an abbreviation for "Light Detection And Ranging", that is, a technique for detection that uses light. With this technique, an irradiated light beam is scattered by fine aerosol floating in the atmosphere, the scattered beam is received, and the frequency variation amount (wavelength variation amount) according to the Doppler effect is measured, whereby the wind velocity is measured. Accordingly, the method is called Doppler lidar. Airborne weather radars that have already found practical use have an effective range as large as several hundreds of kilometers. In the usual mode, the observation screen is displayed at all times and the pilot can look at the screen as necessary, thereby making it possible to take the appropriate measures in advance. However, since the weather radars use scattering of microwaves on water droplets contained in the atmosphere, they are not effective when the sky is clear. By contrast, the Doppler lidar is effective when the sky is clear, but the effective range is greatly limited by comparison with that of the weather radars. Therefore, when the pilot determines the degree of danger and starts an optimal avoidance maneuver, while monitoring the display screen, the time interval for taking appropriate measures is short and therefore the probability of human error is high. Therefore, when the optimal avoidance trajectory is automatically determined by a device and a function of notifying the pilot of this trajectory is provided, the pilot may maneuver the aircraft according to this trajectory and the load on the pilot can be reduced.

The effective distance of a Doppler lidar is about 10 km and this short distance impedes the practical use thereof. Accordingly, methods for extending this distance have been researched and developed. However, since the Doppler lidar is an airborne device, strict restrictions are placed on the size, weight, and power consumption thereof and a significant increase in output is difficult to achieve. The improvements over the next several years can extend the distance only to about 20 km. Further significant increase in the distance is also impossible because the lidar uses light waves. A very large number of conditions can be considered for emergency avoidance maneuvers, but if a distance necessary to change a heading azimuth of a passenger jet aircraft by 90 degrees at a maximum cruise velocity of 250 m/s is calculated by way of simple example, the distance will be 12.8 km at a 30-degree bank turn under normal circumstances and 7.4 km at a maximum 60-degree bank turn allowed for the passenger aircraft. Therefore, aircraft capabilities suggest multiple conditions enabling the avoidance of turbulence even within the present effective range of Doppler lidar. However, the allowed time is actually very limited and it is possible that human decision will fail to select the optimal avoidance flight. In addition, it can be supposed that performing an abrupt operation will increase shaking of the fuselage to a degree larger than that caused by the encounter with turbulence.

When an aircraft encounters turbulence and the fuselage shakes, a pilot report is issued. The number of reports about the encounters with moderate turbulences in Japan is about 10,000 per year, and the number of reports about the encounters with severe turbulences is about 200 per year. Among them, about 1 to 2 encounters per year actually resulted in turbulence-induced accidents. In the case of moderate turbulences, it is not necessary to get involved in emergency avoidance, and a normal avoidance maneuver will apparently be sufficient. However, in the case of severe turbulence, the danger of encounter and the danger of emergency avoidance should be evaluated and a safer means should be used. However, it is difficult for a pilot to evaluate these levels of danger instantaneously and the possibility of making a wrong decision cannot be denied.

According to the present navigational standards, when a passenger aircraft deviates from a present flight path, such deviation should be allowed by an air traffic controller. Therefore, in order to use the device in accordance with the present invention effectively, it is apparently necessary to change the standards so that the instructions of an air traffic controller can be overridden as in a TCAS (Traffic alert and Collision Avoidance System) or to take appropriate measures such as electronic automation of air control services. However, the device can still be effectively used under present standards in a partial flight phase such as landing and flight-path angle change at ascending or descending trajectory. Incidentally, the TCAS malfunctioned in many cases at the initial stage of development and has been confirmed for use only for reference at the initial stage of practical implementation, but reliability thereof has been increased through many years of successful operation and the installation thereof on passenger aircraft is now mandatory. At present, this system overrides the instructions of air traffic controllers.

SUMMARY OF THE INVENTION

The present invention resolves the above-described problems and it is an object thereof to provide a turbulence avoidance operation assist device that automatically generates an optimal trajectory of emergency avoidance and reports this trajectory to a pilot when distant turbulence is detected during an aircraft flight.

In order to attain the above-described object, the turbulence avoidance operation assist device as an airborne device in accordance with the present invention includes: a Doppler lidar for detecting the presence of a danger region such as a turbulence region ahead of an aircraft in a flight direction; a unit for representing the danger region as an assembly of rectangular solids when the Doppler lidar recognizes the danger region, and generating a flight trajectory by a local optimum solution of an avoidance trajectory using a convex quadratic programming method in which deviation from a reference trajectory is the smallest on the basis of an initial estimation solution obtained by a semidefinite programming method; and a unit for reporting the flight trajectory to a pilot. Further, two trajectories, which are one contingent upon a constant flight-path angle and the other contingent upon a constant heading angle, are calculated as optimal avoidance trajectories.

As for the size of the rectangular solid representing a limiting region in which an avoidance trajectory can be present in each update cycle of avoidance trajectory, an initial position of a fuselage is taken as an end surface, an axial position of the fuselage is taken as a central position of the end surface, and a length in the fight direction, height, and width thereof are set correspondingly to a resolution of the detection unit.

The turbulence avoidance operation assist device in accordance with the present invention uses formulating constraints equations in an IF-THEN syntax as a computation technique in the semidefinite programming method and the convex quadratic programming method.

Further, rectangular solids of the danger region are classified into three groups according to the intensity of turbulence and a function is provided to report a danger region not as being an avoidance object when the flight trajectory is an assembly only of weak turbulent regions, and to generate and report an avoidance trajectory based on the usual steering with a bank angle of equal to or less than 30 degrees when a moderate turbulent region is included, and moreover to generate and report an avoidance trajectory based on emergency steering with a bank angle of equal to or less than 60 degrees when a severe turbulent region is included.

When the turbulence avoidance operation assist device in accordance with the present invention is installed on an aircraft, even when turbulence ahead of the aircraft is detected, it is not necessary for the pilot to establish immediately adequate measures for avoiding the danger, and the danger region can be avoided by following the commands of the turbulence avoidance operation assist device. Further, even when the turbulent region is wide and cannot be avoided due to limited capabilities of the aircraft, by performing operations according to the commands of the device, it is possible to select a trajectory that is the closest to the peripheral zone of the turbulence region. The turbulence avoidance operation assist device can thus reduce human errors and therefore can be expected to be advantageous for preventing turbulence-induced accidents of aircraft and will be able to make a significant contribution to the increased safety of air traffic.

Further, in the turbulence avoidance operation assist device in accordance with the present invention, constraints equations are formulated in an IF-THEN syntax as a computation technique in the semidefinite programming method and the convex quadratic programming method. As a result, the number of essential constraints equations can be greatly reduced by comparison with the conventional system using a logical sum and the computation speed can be increased.

In the turbulence avoidance operation assist device, rectangular solids of the danger region are classified into three groups according to the intensity of turbulence and a function is provided by which a danger region is reported as being other than an avoidance object when the flight trajectory is an assembly only of weak turbulent regions, an avoidance trajectory based on the usual steering with a bank angle of equal to or less than 30 degrees is generated and reported when a moderate turbulent region is included, and an avoidance trajectory based on emergency steering with a bank angle of equal to or less than 60 degrees is generated and reported when a severe turbulent region is included, and with such a device, it is possible to avoid performing an excess maneuver (trajectory correction) for avoiding a turbulent region with a low level of danger and also avoid the danger of causing fuselage shaking that is greater than that caused by the encounter with the turbulent region.

DESCRIPTION OF THE PREFERRED EMBODIMENTS

The present invention will be described below in greater detail on the basis of embodiments thereof illustrated by the appended drawings.

Figure 1:
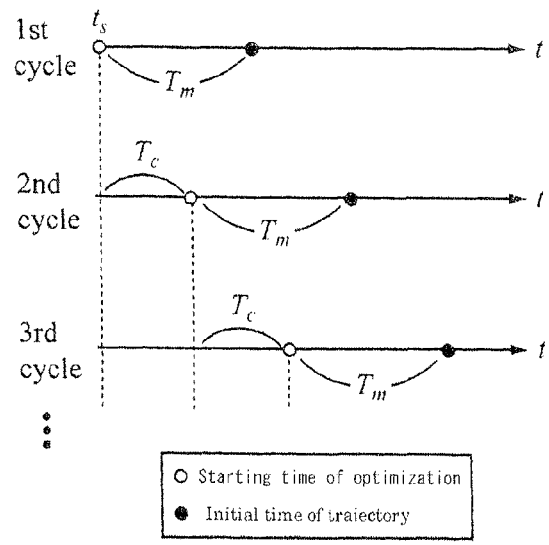
FIG. 1 illustrates the starting time of computation in each update cycle and initial time of avoidance trajectory in accordance with the present invention.

An avoidance trajectory is updated by solving an optimization problem in real time for each predetermined time interval (Tc, seconds). FIG. 1 shows a starting time of computation in one update cycle and an initial time of the calculated avoidance trajectory. By setting the initial time after a constant time interval (Tm, seconds) has elapsed since the starting time of computation, it is possible to update the safe trajectory that reflects a time required for computations and a reaction time of the pilot after the trajectory has been presented.

Figure 2:
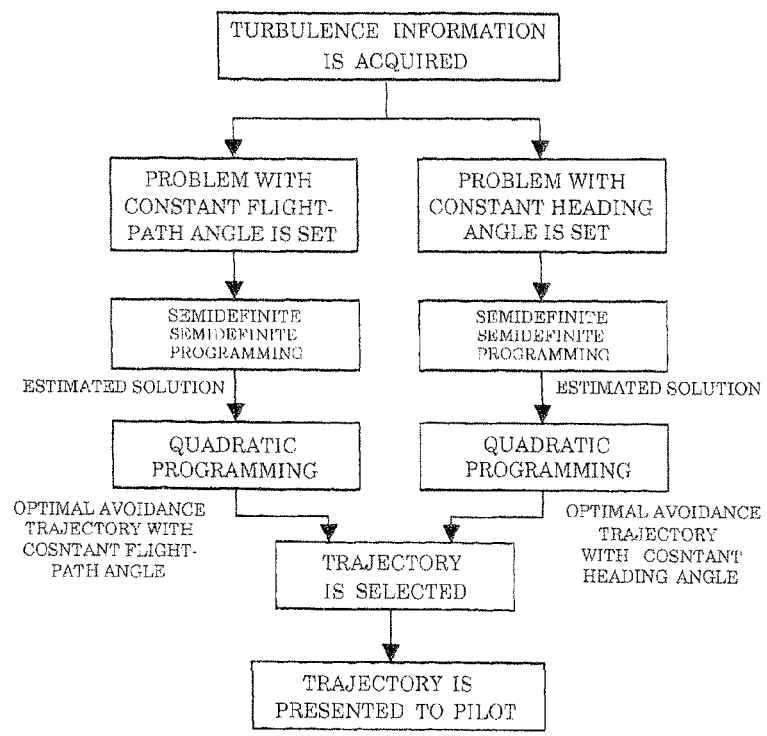
FIG. 2 is a flowchart of an update cycle of an avoidance trajectory in accordance with the present invention.

As shown in FIG. 2, in one update cycle, an optimal avoidance trajectory with a constant flight-path angle and an optimal avoidance trajectory with a constant heading angle are determined by discretization for (N+1) nodes each, and the trajectory for which the number of nodes present in the turbulent region is smaller is selected. When the number of nodes present in the turbulent region is the same for both trajectories, a trajectory with a smaller deviation from the reference trajectory is selected. Equation (1) is used as an indicator of deviation from the reference trajectory.

$$K = \Sigma_{k=1}^{N} [\{x(k) - x_r(k)\}^2 + \{y(k) - y_r(k)\}^2 + \sigma\{h(k) - h_r(k)\}^2] \quad (1)$$

where k is an index of points (nodes) that divide the trajectory, x, y are coordinates of the avoidance trajectory in a horizontal plane, h is an altitude of the avoidance trajectory, $x_r$, $y_r$ are coordinates of the reference trajectory in the horizontal plane, $h_r$ is an altitude of the reference trajectory, and $\sigma$ is a weight factor applied to reference trajectory deviation in the altitude direction.

When the respective avoidance trajectories are calculated, a two-stage solution method is used by which initially an estimated solution of a global optimum solution is found by solving a semidefinite programming problem and then an appropriate local optimum solution is found by solving a convex quadratic programming problem based on the estimated solution.

The state equation of the aircraft is represented by Eq. (2).

$$dx/dt = V \cos\gamma \cos\psi,$$

$$dy/dt = V \cos\gamma \sin\psi,$$

$$dh/dt = V \sin\gamma,$$

$$d\psi/dt = \omega,$$

$$d\gamma/dt = (\gamma_c - \gamma)/T_\gamma,$$

$$d\omega/dt = (\omega_c - \omega)/T_\omega,$$

$$dV/dt = (V_c - V)/T_V, \quad (2)$$

where $\gamma$ is a flight-path angle, $\psi$ is a heading angle, $\omega$ is a rate of turn, V is a velocity, $T_\gamma$ is a time constant of the flight-path angle, $T_\omega$ is a time constant of the rate of turn, $T_V$ is a time constant of the velocity, $\gamma_c$ is a command for flight-path angle, $\omega_c$ is a command for rate of turn, and $V_c$ is a command for velocity.

Figure 3:
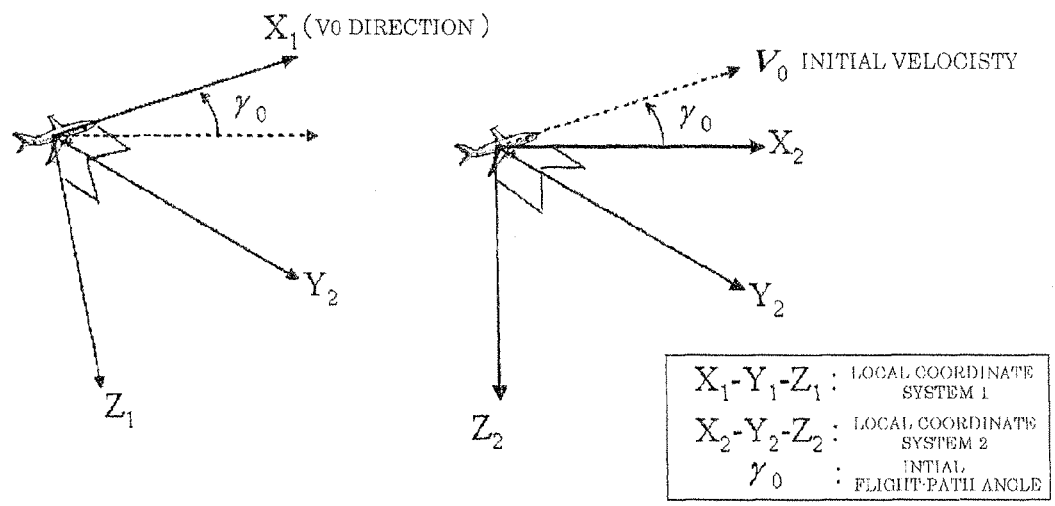
FIG. 3 illustrates local coordinate systems used when avoidance trajectories with a constant flight-path angle and a constant heading angle are determined.

FIG. 3 shows a local coordinate system 1 used when determining an avoidance trajectory with a constant flight-path angle and a local coordinate system 2 used when determining an avoidance trajectory with a constant heading angle. In the local coordinate system 1, an estimated position of the aircraft at the initial time obtained from the past trajectory computation results is taken as an origin point, the direction indicated by a vector obtained by projecting the estimated velocity vector of the aircraft at the initial time (referred to hereinbelow as initial velocity vector) on a horizontal plane is taken as an X axis, a vertical direction is taken as a Z axis, and a direction forming a right-handed orthogonal system with these axes is taken as an Y axis. The local coordinate system 2 is obtained by rotating the local coordinate system 1 about the Y axis and matching the X axis with the direction of the initial velocity vector of the aircraft at the initial time. A position coordinate of the aircraft in the local coordinate system 1 is represented by *1, and a position coordinate of the aircraft in the local coordinate system 2 is represented by *2.

$$*1: (\bar{x}, \bar{y}, \bar{h}), *2: (\tilde{x}, \tilde{y}, \tilde{h}) \quad (3)$$

The avoidance trajectories with a constant flight-path angle and a constant heading angle are represented by conducting equidistant discretization with (N+1) nodes in the X axis direction in the local coordinate system 1 and local coordinate system 2. By using the local coordinate system 1 when computing the trajectory with a constant flight-path angle, it is possible to determine the altitude and velocity in each node in advance from Eq. (4) before the optimization computation.

$$\tilde{h}(0) = \tilde{h}_0 \quad (4)$$

$$\tilde{h}(k+1) = \tilde{h}(k) + \Delta\tilde{x}\tan\gamma_0 \quad (k = 0, \ldots, N-1)$$

$$V(0) = V_0$$

$$V(k+1) = V(k) + \Delta\tilde{x}\frac{V_c - V(k)}{V(k)T_V\cos\gamma_0} \quad (k = 0, \ldots, N-1)$$

where $\Delta\tilde{x}$ is a distance between the nodes in the X axis direction of the local coordinate system 1, and $h_0$, $V_0$, $\gamma_0$ are values of h, V, $\gamma$ designated in the initial point of the trajectory.

Likewise, by using the local coordinate system 2 when computing the trajectory with a constant heading angle, it is possible to determine the Y coordinate value and velocity in each node in advance from Eq. (5) before the optimization computation.

$$\bar{y}(k) = 0 \quad (k = 0, \ldots, N) \quad (5)$$

$$V(0) = V_0$$

$$V(k+1) = V(k) + \Delta\bar{x}\frac{V_c - V(k)}{V(k)T_V} \quad (k = 0, \ldots, N-1)$$

where $\Delta\bar{x}$ is a distance between the nodes in the X axis direction of the local coordinate system 2.

Thus, by using the local systems 1 and 2 of coordinates, it is possible to determine some variables in advance, reduce the number of variables that are the objects of optimization, and reduce the computational load.

In the optimization, a linearized differential equation is presented as an equality constraint condition of Eq. (6) as an approximation of the state equation of Eq. (2).

Trajectory with a Constant Flight-Path Angle:

$$\tilde{y}(0) = 0$$

$$\tilde{y}(k+1) = \tilde{y}(k) + \frac{\Delta\tilde{x}}{2}\{\chi(k+1) + \chi(k)\} \quad (k = 0, \ldots, N-1)$$

$$\chi(0) = 0$$

$$\chi(k+1) = \chi(k) + \frac{\Delta\tilde{x}}{2\cos\gamma_0}\left\{\frac{\omega(k+1)}{V(k+1)} + \frac{\omega(k)}{V(k)}\right\}$$

$$(k = 0, \ldots, N-1)$$

$$\omega(0) = \omega_0$$

$$\omega(k+1) = \omega(k) + \frac{\Delta\tilde{x}}{2}\left\{\frac{\omega_c(k+1) - \omega(k+1)}{V(k+1)T_\omega\cos\gamma_0} + \frac{\omega_c(k) - \omega(k)}{V(k)T_\omega\cos\gamma_0}\right\}$$

$$(k = 0, \ldots, N-1)$$

Trajectory with a Constant Heading Angle:

$$\bar{h}(0) = \bar{h}_0$$

$$\bar{h}(k+1) = \bar{h}(k) + \frac{\Delta \bar{x}}{2}\{\bar{\gamma}(k+1) + \bar{\gamma}(k)\} \quad (k = 0, \ldots, N-1)$$

$$\bar{\gamma}(0) = 0$$

$$\bar{\gamma}(k+1) = \bar{\gamma}(k) + \frac{\Delta \bar{x}}{2T_\gamma}\left\{\frac{\bar{\gamma}_c(k+1) - \bar{\gamma}(k+1)}{V(k+1)} + \frac{\bar{\gamma}_c(k) - \bar{\gamma}(k)}{V(k)}\right\}$$

$$(k = 0, \ldots, N-1)$$
(6)

where $\chi$ is a variation amount from the initial value ($\psi_0$) of the heading angle, that is, $\chi = \psi - \psi_0$; $\gamma$ is a variation amount from the initial value ($\gamma_0$) of the flight-path angle, that is, $\bar{\gamma} = \gamma - \gamma_0$; $\gamma_c$ is a command relating to $\gamma$, that is, $\bar{\gamma}_c = \gamma_c - \gamma_0$.

Figure 4:
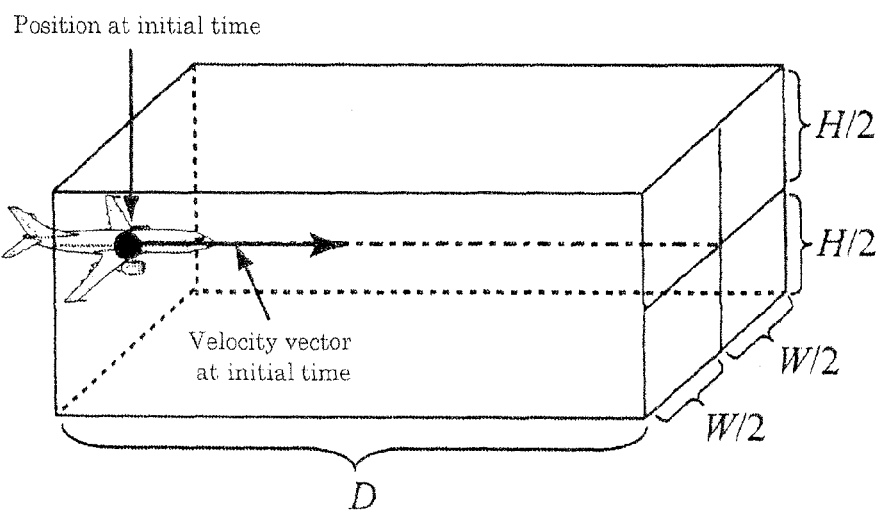
FIG. 4 shows a rectangular solid for limiting a region in which an avoidance trajectory can be present in each update cycle of avoidance trajectory.

As for the size of the rectangular solid representing a limiting region in which an avoidance trajectory can be present in each update cycle of avoidance trajectory, a rectangular solid is set such as shown in FIG. 4. Thus, an initial position that is a present position of the fuselage is taken as an end surface, an axial position of the fuselage is taken as a central position of the end surface, and a length in the light direction, height, and width are set correspondingly to the resolution of the detection unit. Turbulence information is considered to be measured in any region inside the rectangular solid and the avoidance trajectory to be determined is also assumed to be limited to the inner space of the rectangular solid. In addition to this condition, constraints are imposed on a rate of turn and a command thereof, a flight-path angle and a command thereof, and a flight-path angle rate in order to obtain an avoidance trajectory physically suitable for the flight. Moreover, constraints are also imposed on a variation amount $\omega(\kappa)$ of a heading angle to limit a range in which linearization of the heading angle is appropriate. These constraint conditions are represented by inequality (7) below.

Trajectory with a Constant Flight-Path Angle:

$$-W/2 \leq \bar{y}(k) \leq W/2, (k = 1, \ldots, N)$$

$$-\frac{g\tan\phi_{max}}{V(k)\cos\gamma_0} \leq \omega(k) \leq \frac{g\tan\phi_{max}}{V(k)\cos\gamma_0}, (k = 1, \ldots, N)$$

$$-\frac{g\tan\phi_{max}}{V(k)\cos\gamma_0} \leq \omega_c(k) \leq \frac{g\tan\phi_{max}}{V(k)\cos\gamma_0} \quad (k = 0, \ldots, N)$$

$$-\chi_{max} \leq \chi(k) \leq \chi_{max}, (k = 1, \ldots, N)$$

Trajectory with a Constant Heading Angle:

$$-H/2 \leq \bar{h}(k) \leq H/2, (k = 1, \ldots, N)$$
(7)

$$\gamma_{min} - \gamma_0 \leq \bar{\gamma}(k) \leq \gamma_{max} - \gamma_0, (k = 1, \ldots, N)$$

$$\gamma_{min} - \gamma_0 \leq \bar{\gamma}_c(k) \leq \gamma_{max} - \gamma_0, (k = 0, \ldots, N)$$

$$\dot{\gamma}_{min} \leq \frac{\bar{\gamma}_c(k) - \bar{\gamma}(k)}{T_\gamma} \leq \dot{\gamma}_{max} \quad (k = 0, \ldots, N)$$

where g is a gravitational acceleration; $\chi_{max}$ is an allowed value of variation amount of the heading angle from the initial value; $\phi_{max}$ is a maximum allowed bank angle; $\gamma_{min}$, $\gamma_{max}$ are a minimum allowed value and a maximum allowed value of the flight-path angle; $\dot{\gamma}_{min}$, $\dot{\gamma}_{max}$ are a minimum allowed value and a maximum allowed value of the flight-path angle rate.

The turbulent region that should be avoided (moderate turbulent region and severe turbulent region) is represented by a plurality of (the number L of) rectangular solids in the local coordinate system 1 or 2. The number L and the size and arrangement of each rectangular solid vary with time, depending on the measurement results obtained with the Doppler lidar. Further, the size of each rectangular solid also depends on the Doppler lidar resolution. By using the above-described discretization method for representing the avoidance trajectory, it is possible to formulate the constraints for turbulence region avoidance represented by rectangular solids in the IF-THEN syntax of Eq. (9), rather than Eq. (8) using a conventional logical sum (OR).

$$|x(k)-c_x(l)| \geq r_x(l) \text{ or } |y(k)-c_y(l)| \geq r_y(l) \text{ or } |h(k)-c_h(l)| \geq r_h(l)(k=1, \ldots, N, l=1, \ldots, L)$$
(8)

where (x(k), y(k), h(k)) are position coordinates of the aircraft subjected to discretization, ($c_x(l)$, $c_y(l)$, $c_h(l)$) are central coordinates of the l-th rectangular solid region, and ($r_x(l)$, $r_y(l)$, $r_h(l)$) are half lengths of sides in the x, y, h directions in the l-th rectangular solid region.

Trajectory with a constant flight-path angle:

If $|\bar{x}(k)-\bar{c}_x(l)| \leq \bar{r}_x(l)$ and $|\bar{h}(k)-\bar{c}_h(l)| \leq \bar{r}_h(l)$, then $|\bar{y}(k)-\bar{c}_y(l)| \geq \bar{r}_y(l)(k=1, \ldots, N, l=1, \ldots, L)$ Trajectory with a constant heading angle:

If $|\bar{x}(k)-\bar{c}_x(l)| \leq \bar{r}_x(l)$ and $|\bar{y}(k)-\bar{c}_y(l)| \leq \bar{r}_y(l)$, then $|\bar{h}(k)-\bar{c}_h(l)| \geq \bar{r}_h(l)(k=1, \ldots, N, l=1, \ldots, L)$
(9)

where (x(k), y(k), h(k)) are position coordinates of the aircraft subjected to discretization (local coordinate system 1), (c(l), $c_y(l)$, $c_h(l)$) are central coordinates of the l-th rectangular solid region (local coordinate system 1), ($r_x(l)$, $r_y(l)$, $r_h(l)$) are half lengths of sides in the x, y, h directions in the l-th rectangular solid region (local coordinate system 1), (x(k), y(k), h(k)) are position coordinates of the aircraft subjected to discretization (local coordinate system 2), ($c_x(l)$, $c_y(l)$, $c_h(l)$) are central coordinates of the l-th rectangular solid region (local coordinate system 2), and (r(l), r(l), $r_h(l)$) are half lengths of sides in the x, y, h directions in the l-th rectangular solid region (local coordinate system 2).

In the formula using the conventional logical sum, the number of constraint conditions relating to turbulence avoidance is proportional to N×L, whereas in the formulation in the IF-THEN syntax in accordance with the present invention, no constraint condition is used when a preamble condition (IF portion) is not fulfilled. Therefore, the number of essential constraint conditions can be made substantially less than N×L and the computation speed, which is important for real time computations, can be increased. Further, since extra variables for representing a logical sum, as in the conventional method, are not required, a large contribution is made to the increase in computation speed.

The cost function that should be minimized in the optimization problem is a value obtained by combining the sum of squares of deviational errors from the reference trajectory and the sum of squares of variation rates of control inputs, those sums of squares being assigned with weight factors. With the cost function of this format, it is possible to determine an avoidance trajectory that has a small deviation from the reference trajectory and that can be followed by smooth operations of the pilot. Further, in the below-described convex quadratic programming problem, the sum of time-variable $\delta(k)$ (k=1, . . . , N) that is an indicator of the degree to which the avoidance condition for the turbulent region is not fulfilled is also assigned with a weight factor and combined with the above-described value. This additional term makes it possible to determine a trajectory such that will be as far as possible from the center of the turbulent region and will make it possible to slip out of the turbulent region within a short time.

The constraints of the optimization problem are represented by Eqs. (6), (7), and (9), Eqs. (6) and (7) are linear equations, whereas Eq. (9) is a nonlinear and a non-convex equation. Therefore, a plurality of local optimal solutions can be present. Finding directly a global optimal solution for such a problem will require a high computational load and real-time computations are difficult. Accordingly, in accordance with the present invention, the problem is initially solved by relaxing the constraints represented by Eq. (9) to the following Eq. (10).

Trajectory with a constant flight-path angle:

If $|\tilde{x}(k) - \tilde{c}_x(l)| \leq \tilde{r}_x(l)$ and $|\tilde{h}(k) - \tilde{c}_h(l)| \leq \tilde{r}_h(l)$, then $\tilde{p}_{yy}(k) - 2\tilde{c}_y(l)\tilde{y}(k) + \tilde{c}_y(l)^2 \geq \tilde{r}_y(l)^2$ $(k = 1, \ldots, N, l = 1, \ldots, L)$, $\begin{bmatrix} 1 & \tilde{y}(k) \\ \tilde{y}(k) & \tilde{p}_{yy}(k) \end{bmatrix} \geq 0 \ (k = 1, \ldots, N)$ Trajectory with a constant heading angle:

If $|\overline{x}(k) - \overline{c}_x(l)| \leq \overline{r}_x(l)$ and $|\overline{y}(k) - \overline{c}_y(l)| \leq \overline{r}_y(l)$, then (10)

$\overline{p}_{hh}(k) - 2\overline{c}_h(l)\overline{h}(k) + \overline{c}_h(l)^2 \geq \overline{r}_h(l)^2$ $(k = 1, \ldots, N, l = 1, \ldots, L)$, $\begin{bmatrix} 1 & \overline{h}(k) \\ \overline{h}(k) & \overline{p}_{hh}(k) \end{bmatrix} \geq 0 \ (k = 1, \ldots, N)$ where $p_{yy}(k)$, $p_{hh}(k)$ are optimization variables introduced for relaxation.

The cost function in this problem can be given by Eq. (12) on the basis of auxiliary variables satisfying Eq. (11).

Trajectory with a constant flight-path angle:

$\Sigma_{k=0}^{N}\{\omega_c(k) - \omega(k)\}^2 \leq \tilde{v}$

Trajectory with a constant heading angle:

$\Sigma_{k=0}^{N}\{\overline{\gamma}_c(k) - \overline{\gamma}(k)\}^2 \leq \overline{v}$ (11)

Trajectory with a constant flight-path angle:

$J = \tilde{q}_1 \Sigma_{k=1}^{N}\{p_{yy}(k) - 2\tilde{y}_r(k)\tilde{y}(k) + \tilde{y}_r(k)^2\} + \tilde{q}_2 \tilde{v}$, Trajectory with a constant heading angle:

$J = \overline{q}_1 \Sigma_{k=1}^{N}\{p_{hh}(k) - 2\overline{h}_r(k)\overline{h}(k) + \overline{h}_r(k)^2\} + \overline{q}_2 \overline{v}$, (12)

where $\tilde{q}_1, \tilde{q}_2, \overline{q}_1, \overline{q}_2$ are positive weight factors.

In accordance with the present invention, the optimization problem is initially solved by taking Eq. (12) as a cost on the basis of constraints represented by Eqs. (6), (7), (10), and (11). This problem is a semidefinite programming problem and therefore an algorithm of reliable convergence by infinite number of iterative computations can be used. As a result, reliability in real time computations is high. As described in E. Frazzoli, Z.-H. Mao, J.-H. Oh, and E. Feron, "Resolution of Conflicts Involving Many Aircraft via Semidefinite Programming," Journal of Guidance, Control, and Dynamics, Vol. 24, No. 1, pp. 79-86, 2001, the solution of this semidefinite programming problem becomes a probabilistically average value of a global optimal solution in the optimization problem in which constraints are not relaxed and therefore can be considered as a good evaluation solution of the global optimal solution. Accordingly, by using the estimation solution, it is possible to use Eq. (13) instead of Eq. (10) as a constraints equation, and a convex quadratic programming problem of minimizing the cost function of Eq. (14) can be eventually constituted on the basis of the constraints represented by Eqs. (6), (7), and (13). By solving such convex quadratic programming problem, it is possible to obtain a local optimal solution for the optimization problem in which constraints are not relaxed. Further, since the convex quadratic programming problem also uses the algorithm of reliable convergence by infinite number of iterative computations, reliability of real-time computations is high.

Trajectory with a constant flight-path angle:

If $|\tilde{x}(k) - \tilde{c}_x(l)| \leq \tilde{r}_x(l)$ and $|\tilde{h}(k) - \tilde{c}_h(l)| \leq \tilde{r}_h(l)$, then $\begin{cases} \text{if } \tilde{y}_{SDP}(k) - \tilde{c}_y(l) \geq 0 \text{ then } \tilde{y}(k) - \tilde{c}_y(l) \geq \tilde{r}_y(l)[1 - \delta(k)], \\ \text{otherwise} \quad \tilde{c}_y(l) - \tilde{y}(k) \geq \tilde{r}_y(l)[1 - \delta(k)] \end{cases}$ $(k = 1, \ldots, N, l = 1, \ldots, L)$, Trajectory with a constant heading angle:

If $|\overline{x}(k) - \overline{c}_x(l)| \leq \overline{r}_x(l)$ and $|\overline{y}(k) - \overline{c}_y(l)| \leq \overline{r}_y(l)$, (13)

then $\begin{cases} \text{if } \overline{h}_{SDP}(k) - \overline{c}_h(l) \geq 0 \text{ then } \overline{h}(k) - \overline{c}_h(l) \geq \overline{r}_h(l)[1 - \delta(k)], \\ \text{otherwise} \quad \overline{c}_h(l) - \overline{h}(k) \geq \overline{r}_h(l)[1 - \delta(k)] \end{cases}$ $(k = 1, \ldots, N, l = 1, \ldots, L)$, where $y_{SPD}(k)$, $h_{SDP}(k)$ are $y(k)$, $h(k)$ determined as solutions of the semidefinite programming problem.

Trajectory with a constant flight-path angle:

$J = \tilde{q}_1 \Sigma_{k=1}^{N}\{\tilde{y}(k) - \tilde{y}_r(k)\}^2 + \tilde{q}_2 \Sigma_{k=0}^{N}\{\omega_c(k) - \omega(k)\}^2 + \tilde{q}_3 \Sigma_{k=1}^{N}\delta(k)$ Trajectory with a constant heading angle:

$J = \overline{q}_1 \Sigma_{k=1}^{N}\{\overline{h}(k) - \overline{h}_r(k)\}^2 + \overline{q}_2 \Sigma_{k=0}^{N}\{\overline{\gamma}_c(k) - \overline{\gamma}(k)\}^2 + \overline{q}_3 \Sigma_{k=1}^{N}\delta(k)$ (14)

where $\tilde{q}_s$, $\overline{q}_s$, are positive weight factors.

When an avoidance trajectory with a constant heading angle is computed, the rate of turn at the initial time of the trajectory is sometimes not zero. In such cases a segment is inserted for causing the convergence of the rate of turn to zero at a constant flight-path angle. The transition of state variables in this segment is determined by repeating calculations with Eq. (15) till $\omega(k+1)$ converges to zero.

$$\tilde{y}(k+1) = \tilde{y}(k) + \Delta \tilde{x} \tan \chi(k)$$ (15)

$$\tilde{h}(k+1) = \tilde{h}(k) + \Delta \tilde{x} \frac{\tan \gamma_0}{\cos \chi(k)}$$

$$\chi(k+1) = \chi(k) + \Delta \tilde{x} \frac{\omega(k)}{V(k) \cos \gamma_0 \cos \chi(k)}$$

$$\omega(k+1) = \omega(k) + \Delta \tilde{x} \cdot \frac{\omega_c^*(k) - \omega(k)}{V(k) T_\omega \cos \gamma_0 \cos \chi(k)}$$

$$V(k+1) = V(k) + \Delta \tilde{x} \frac{V_c - V(k)}{V(k) T_V \cos \gamma_0 \cos \chi(k)}$$

-continued $$\omega_c^*(k) = \max \begin{bmatrix} -\frac{g\tan\phi_{max}}{V(k)\cos\gamma_0}, \\ \min \begin{Bmatrix} \omega(k)\left(1 - \frac{\Delta\tilde{x}\sec\chi(k)}{V(k)T_\omega\cos\gamma_0}\right), \\ \frac{g\tan\phi_{max}}{V(k)\cos\gamma_0} \end{Bmatrix} \end{bmatrix}$$

The initial time and initial state in the avoidance trajectory with a constant heading angle is replaced with end time and state in this segment.

Example 1

Turbulences are classified into three groups according to intensity thereof. For example, an Fh-factor (a factor obtained by emitting a laser beam forward, acquiring a wind velocity U toward a measurement object area, differentiating the wind velocity U in this direction with respect to time, and converting to a dimensionless value by dividing by the gravitational acceleration g) defined in Japanese Patent Application Laid-open No. 2007-232695, "Turbulence Detection Method", published on Sep. 13, 2007, can be used as a factor representing the intensity of turbulence, and the correlation between this factor and the degree of fuselage shaking is found from flight data. The degree of fuselage shaking is classified on the basis of a root mean square of vertical acceleration into shaking caused by a weak turbulence (less than 0.1 G), shaking caused by a moderate turbulence (equal to or greater than 0.1 G and less than 0.3 G), and shaking caused by a severe turbulence (equal to or greater than 0.3 G).

According to this classification, a weak turbulent region is handled similarly to a region in which no turbulence is present, that is, not as an avoidance object. The moderate turbulent region generates an avoidance trajectory assuming usual steering with a bank angle of equal to or less than 30 degrees. The severe turbulent region generates an avoidance trajectory assuming emergency steering with a bank angle equal to or less than 60 degrees.

Figure 5:
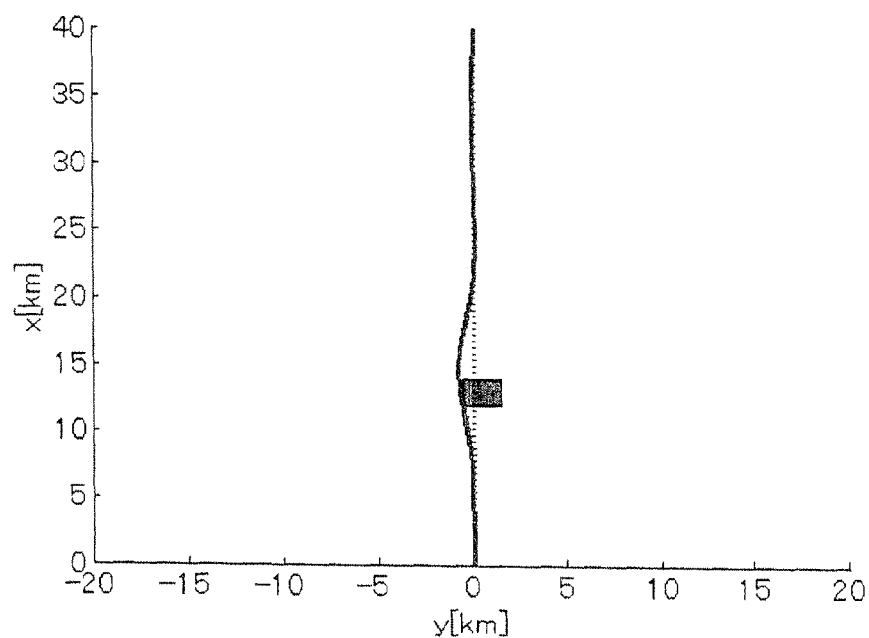
FIG. 5 shows an example of optimal trajectory in the case the present invention is applied to avoid a single turbulent region.
Figure 6:
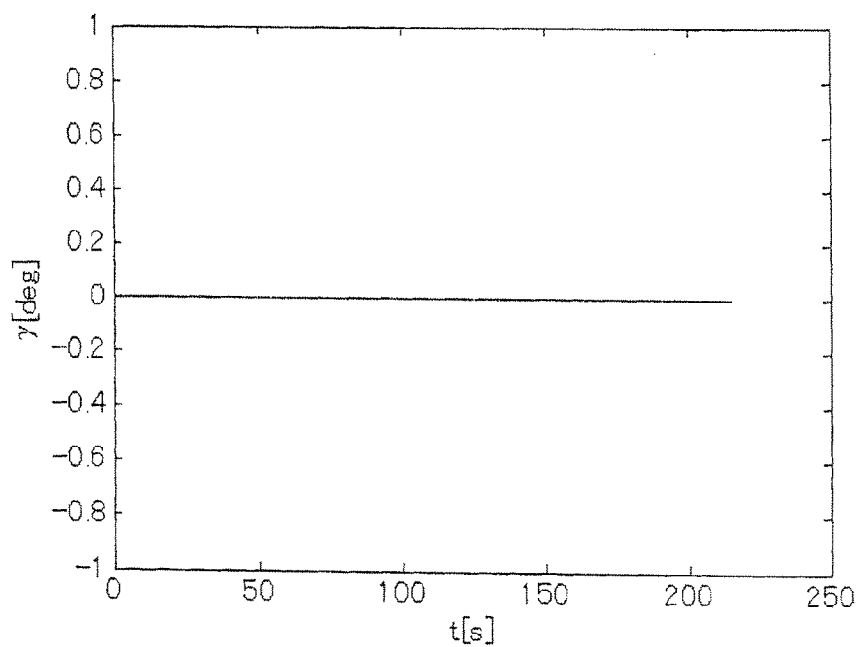
FIG. 6 shows the time history of flight-path angle at which the trajectory shown in FIG. 5 is realized.
Figure 7:
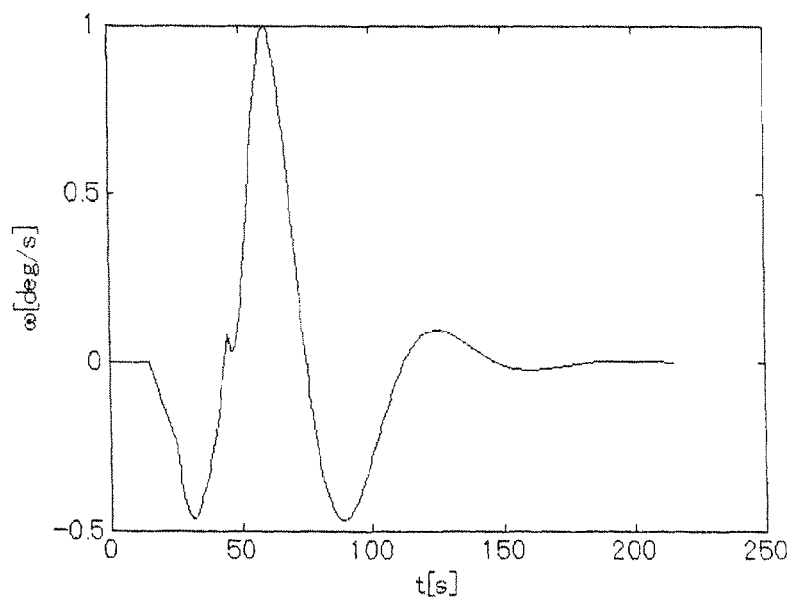
FIG. 7 shows the time history of rate of turn at which the trajectory shown in FIG. 5 is realized.

FIGS. 5 to 7 show an example of results obtained in simulation of turbulent region avoidance. A moderate turbulent region is assumed to be detected and the maximum value of bank angle is set to 30 degrees. The aircraft velocity is taken to decrease from the initial value of 255 m/s to 240 m/s (Vc in Eq. (2)), and the rectangular solid defined in FIG. 4 is taken to have the following dimensions: D=10 km, W=7.279 km, and H=1.750 km. The trajectory update period (Tc) is 10 s, margin time (Tm) is 15 s, upper and lower limits of the flight-path angle are ±1.15 deg, upper and lower limits of variation rate of the flight-path angle with time are ±0.45 deg/s, and time constants in Eq. (2) are $T\gamma$=3 s, $T\omega$=3 s, and $T\omega$=10 s. In Eq. (1), is taken as 100, and weight factors in Eqs. (12) and (14) are as follows:

$$\tilde{q}_1 = 0.01, \tilde{q}_2 = 0.5, \tilde{q}_3 = 1, \bar{q}_1 = 0.01, \bar{q}_2 = 0.5, \bar{q}_3 = 1 \quad (16)$$

In FIG. 5, the reference trajectory is shown by a dot line and the obtained optimal trajectory is shown by a solid line. With the optimal trajectory, the turbulent region represented by a single rectangular solid can be reliably avoided and reliable return to the reference trajectory after the avoidance can be confirmed. FIG. 6 shows the time history of flight-path angle at which the trajectory shown in FIG. 5 is realized, and FIG. 7 shows the time history of rate of turn at which the trajectory shown in FIG. 5 is realized.

Example 2

Figure 8:
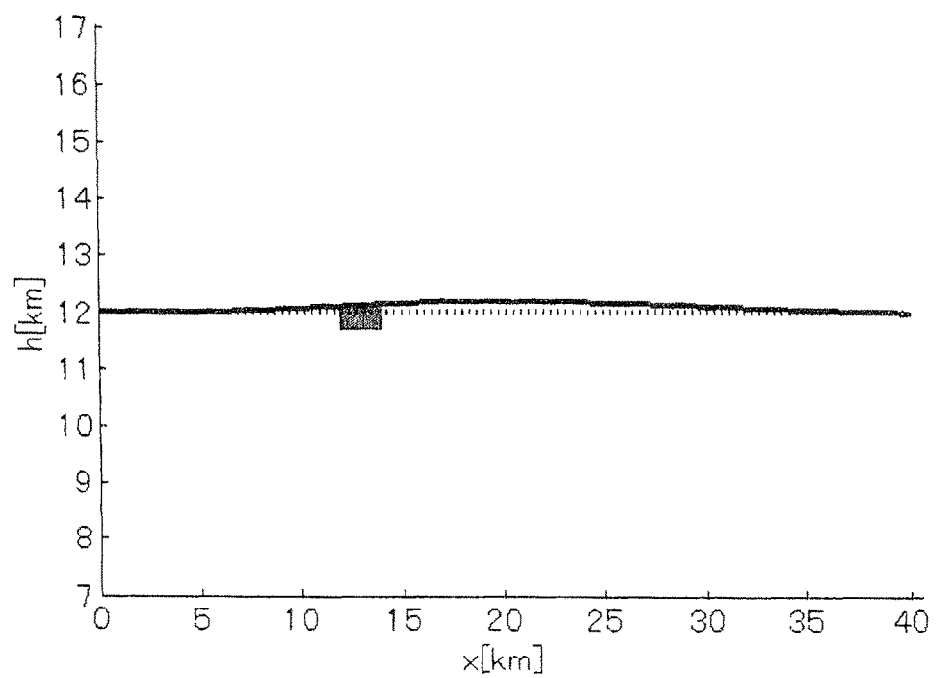
FIG. 8 shows an example of optimal trajectory in the case in which the present invention is applied to avoid a single turbulent region on the basis of parameter setting different from that in the example illustrated by FIGS. 5 to 7.
Figure 9:
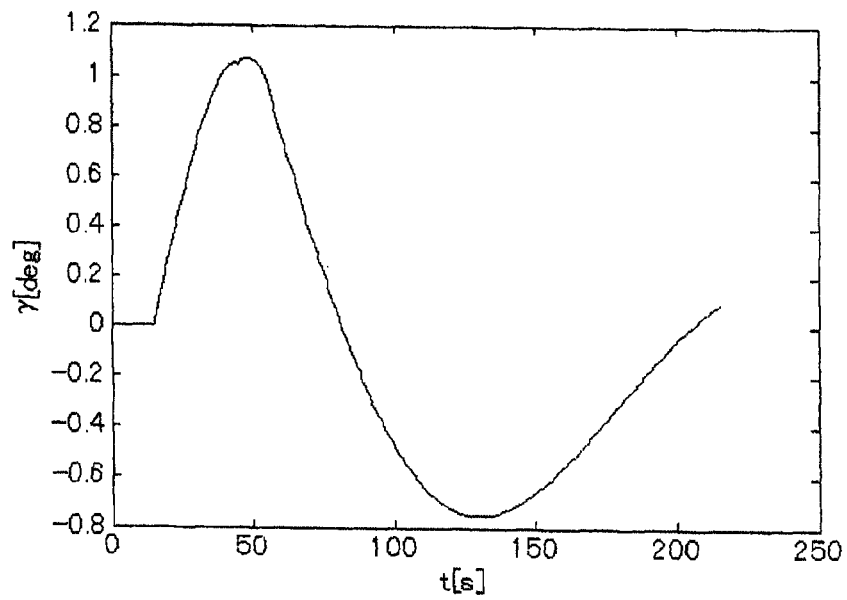
FIG. 9 shows the time history of flight-path angle at which the trajectory shown in FIG. 8 is realized.
Figure 10:
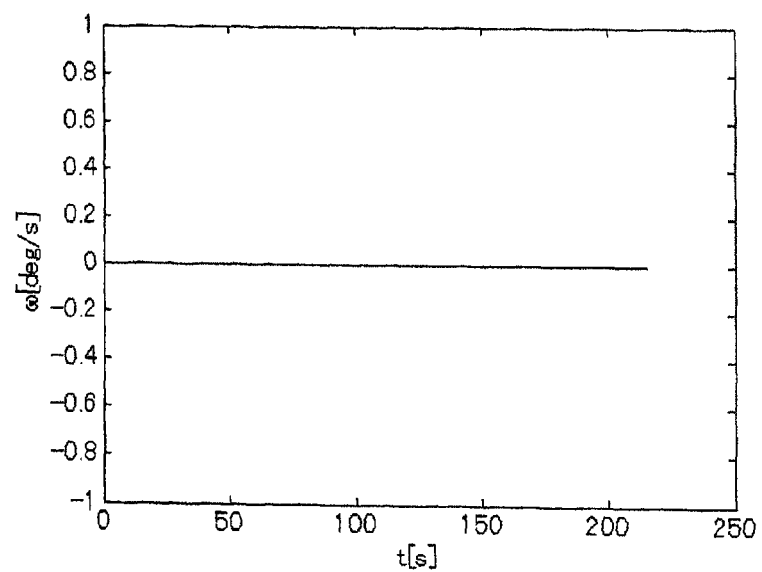
FIG. 10 shows the time history of rate of turn at which the trajectory shown in FIG. 8 is realized.

FIGS. 8 to 10 illustrate results obtained in another avoidance simulation relating to the same turbulent region as in Example 1. Set values of parameters are the same as in Example 1, except that a is changed to 1. In FIG. 8, the reference trajectory is shown by a dot line and the obtained optimal trajectory is shown by a solid line. The obtained optimal trajectory is a trajectory in which the heading angle is constant and only the flight-path angle is changed over the entire region. As a result, where safe avoidance is possible in both the horizontal direction and the vertical direction, which of the direction is intended can be changed by changing the weight factor of trajectory deviation. FIG. 9 shows the time history of flight-path angle at which the trajectory shown in FIG. 8 is realized, and FIG. 10 shows the time history of rate of turn at which the trajectory shown in FIG. 8 is realized.

Example 3

Figure 11:
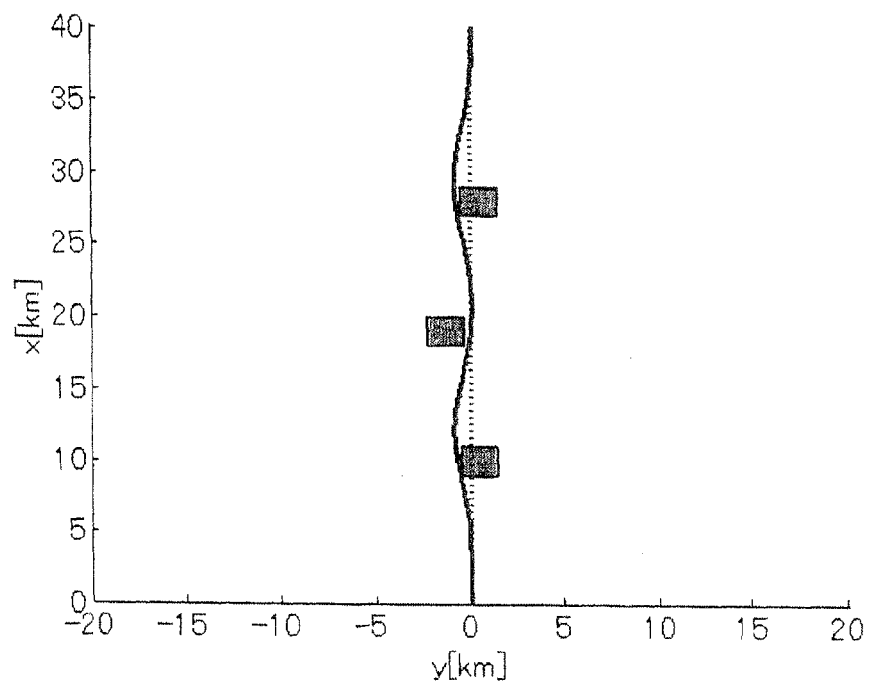
FIG. 11 shows an example of optimal trajectory in the case in which the present invention is applied to avoid three turbulent regions.
Figure 12:
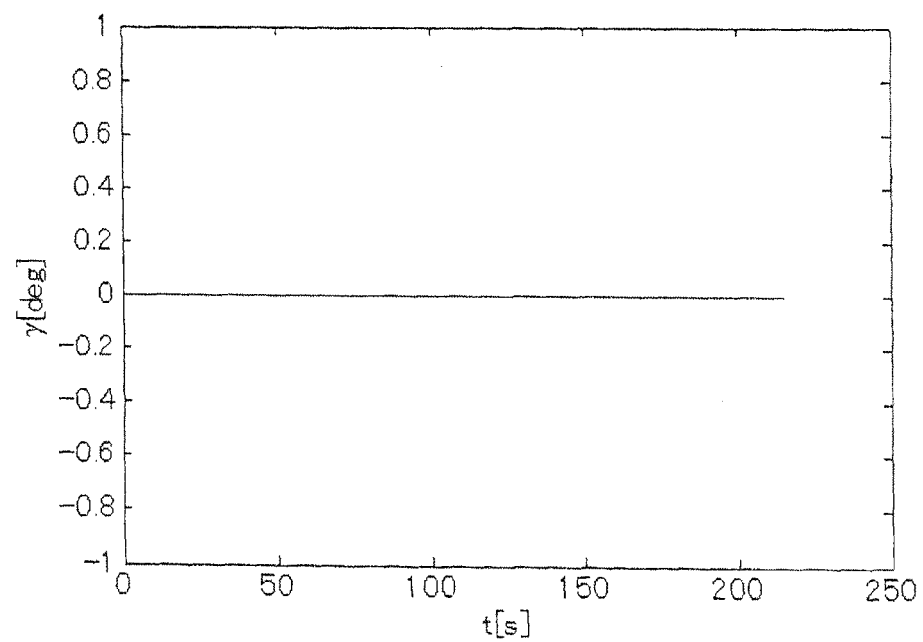
FIG. 12 shows the time history of flight-path angle at which the trajectory shown in FIG. 11 is realized.
Figure 13:
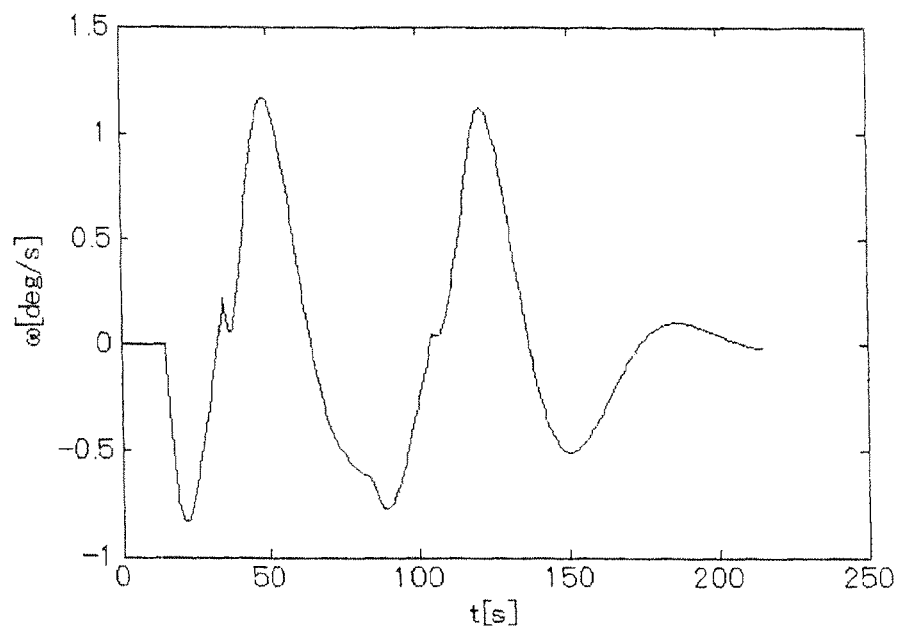
FIG. 13 shows the time history of rate of turn at which the trajectory shown in FIG. 11 is realized.

FIGS. 11 to 13 show simulation results obtained with same parameter settings as in Example 1 with respect to a case in which three turbulent regions are artificially set. In FIG. 11, the reference trajectory is shown by a dot line and the obtained optimal trajectory is shown by a solid line. The obtained optimal trajectory is a trajectory in which the flight-path angle is constant and only the heading angle is changed over the entire region; the three turbulent regions are reliably avoided. Since there is a freedom of selecting whether to avoid each turbulent region on the left side or on the right side, a total of at least eight optical avoidance trajectories can be assumed to be locally present in this problem, but the obtained avoidance trajectory becomes the appropriate trajectory with the smallest deviation from the reference trajectory from among all these trajectories. FIG. 12 shows the time history of flight-path angle at which the trajectory shown in FIG. 11 is realized, and FIG. 13 shows the time history of rate of turn at which the trajectory shown in FIG. 11 is realized.

Example 4

Figure 14:
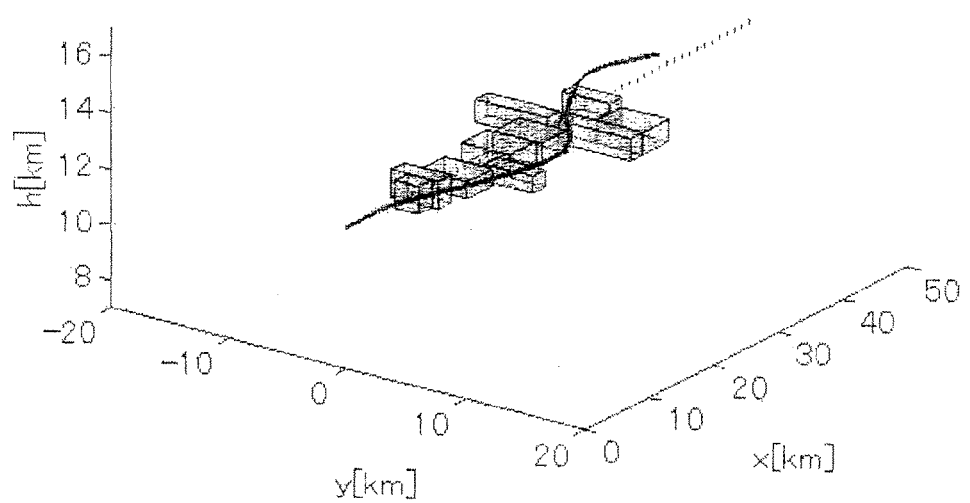
FIG. 14 shows an example of optimal trajectory in the case in which the present invention is applied to avoid ten turbulent regions.
Figure 15:
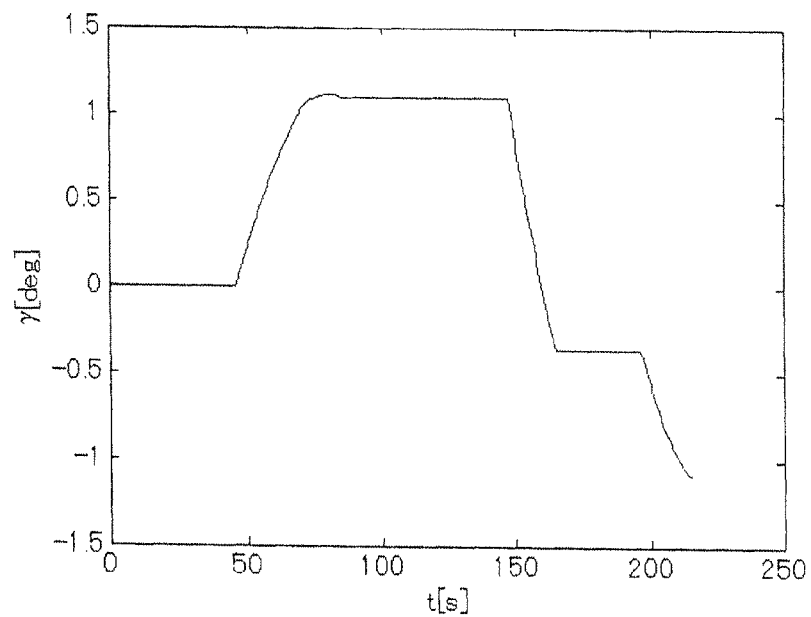
FIG. 15 shows the time history of flight-path angle at which the trajectory shown in FIG. 14 is realized.
Figure 16:
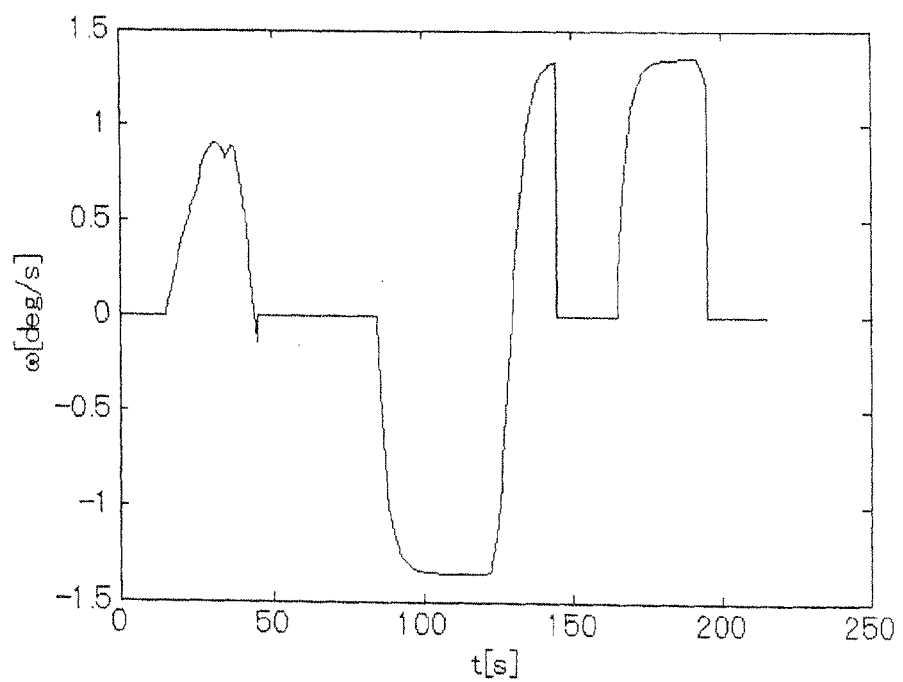
FIG. 16 shows the time history of rate of turn at which the trajectory shown in FIG. 14 is realized.

FIGS. 14 to 16 show simulation results obtained with same parameter settings as in Example 1 with respect to a case in which ten turbulent regions are artificially set. In FIG. 14, the reference trajectory is shown by a dot line and the obtained optimal trajectory is shown by a solid line. The optimal trajectory is a combination of segments with a constant flight-path angle and segments with a constant heading angle, and a turbulent region represented by ten rectangular solids is completely avoided. Further, it is possible to confirm that the flight-path angle and heading angle after the avoidance have returned to those of the reference trajectory. FIG. 15 shows the time history of flight-path angle at which the trajectory shown in FIG. 14 is realized, and FIG. 16 shows the time history of rate of turn at which the trajectory shown in FIG. 14 is realized.

Example 5

Figure 17:
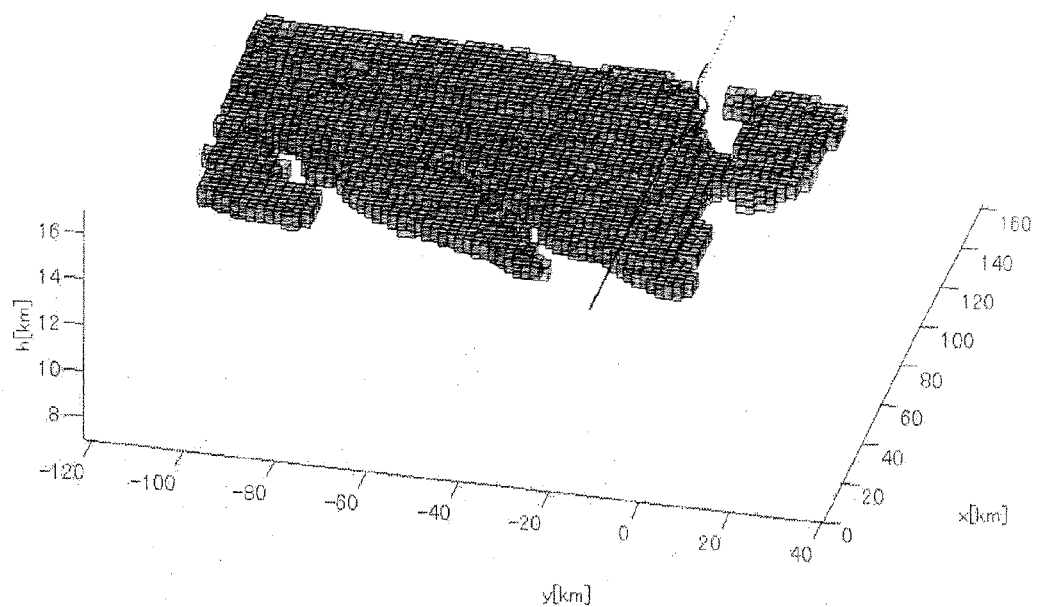
FIG. 17 shows an example of optimal trajectory in the case in which the present invention is applied when an actual turbulent region is simulated.
Figure 18:
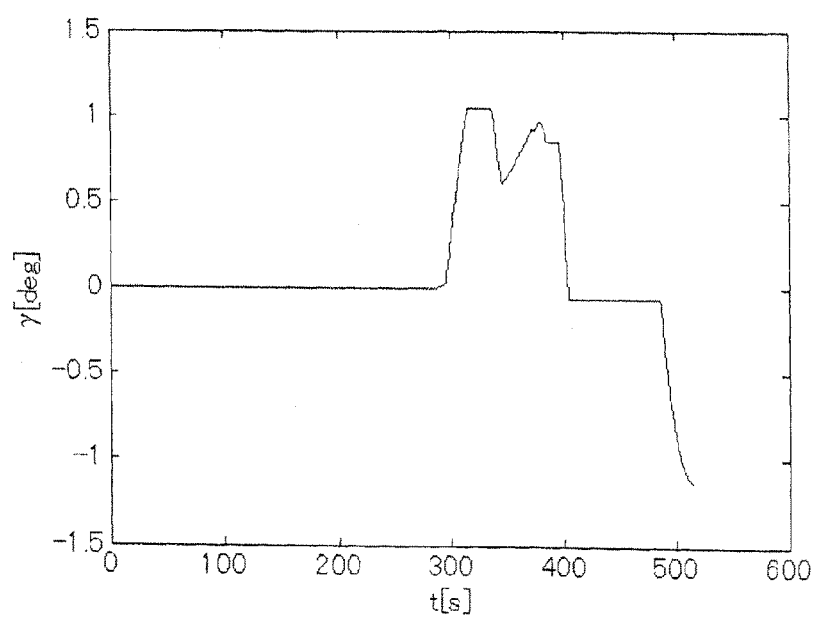
FIG. 18 shows the time history of flight-path angle at which the trajectory shown in FIG. 17 is realized.
Figure 19:
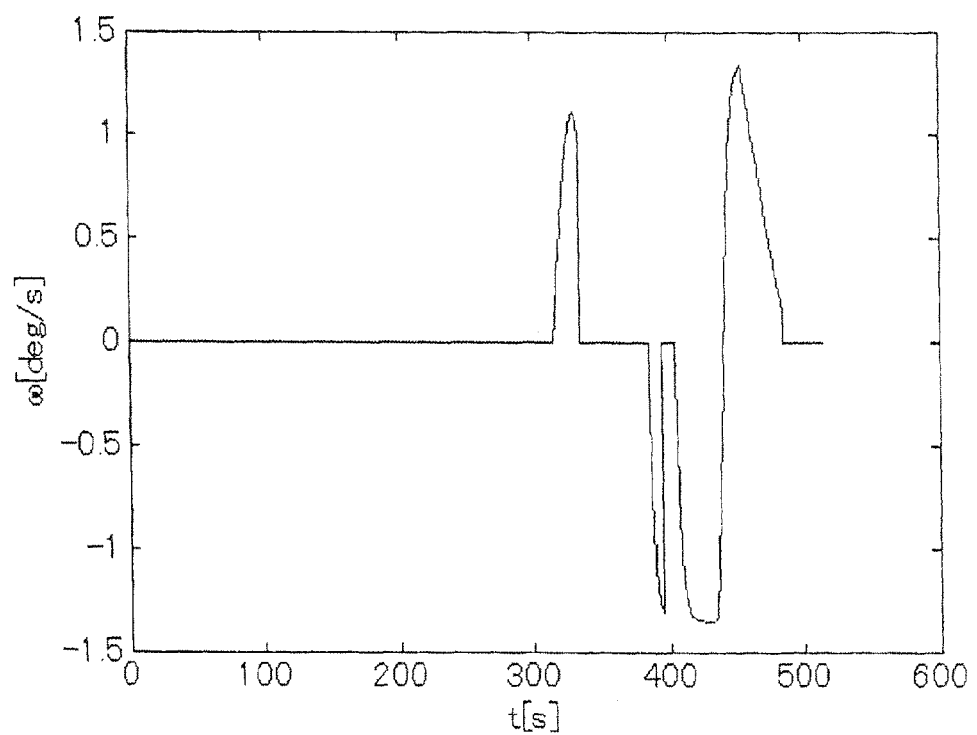
FIG. 19 shows the time history of rate of turn at which the trajectory shown in FIG. 17 is realized.

FIGS. 17 to 19 show an example of simulation performed to simulate an actually appearing turbulent region. The parameter settings are identical to those of Example 1, except that D=20 km, W=14.56 km, and H=3.500 km. In FIG. 17, the reference trajectory is shown by a dot line and the obtained optimal trajectory is shown by a solid line. Safe avoidance in the direction in which no turbulence is present is performed and the method in accordance with the present invention can be confirmed to be effective with respect to an actual turbulent region. FIG. 18 shows the time history of flight-path angle at which the trajectory shown in FIG. 17 is realized, and FIG. 19 shows the time history of rate of turn at which the trajectory shown in FIG. 17 is realized.

The turbulence avoidance operation assist device in accordance with the present invention can be advantageously used us a danger avoidance unit for minimizing damage when a turbulence is detected ahead of an aircraft and also can be used for avoiding a danger region in which ice crystals or volcano ash is distributed in the region in the flight direction.

What is claimed is:

1. A turbulence avoidance operation assist device as an airborne device comprising: a Doppler lidar for detecting the presence of a danger region such as a turbulent region ahead of an aircraft in a flight direction; a unit for representing the danger region as an assembly of rectangular solids when the Doppler lidar recognizes the danger region, and generating a flight trajectory consisting of time-varying variables by a local optimum solution of an avoidance trajectory using a convex quadratic programming method in which deviation from a reference trajectory is the smallest on the basis of an initial estimation solution obtained by a semidefinite programming method; and a unit for reporting, the flight trajectory to a pilot, wherein a size of the rectangular solid of the limiting region is determined by gridding a measurement region corresponding to a resolution of the Doppler lidar, where the measurement region is such that an initial position of a current position of a fuselage is taken as an end surface, and a length in a current flight direction, that is a direction determined by a current flight-path angle and heading angle, a height, and a width thereof are set correspondingly to a measurement range of the resolution of the Doppler lidar.

2. The turbulence avoidance operation assist device according to claim 1, wherein two trajectories, which are one contingent upon a constant flight-path angle and the other contingent upon a constant heading angle, are calculated as optimal avoidance trajectories.

3. The turbulence avoidance operation assist device according to claim 1, wherein constraints condition equations in an IF-THEN syntax are formulated to be used as a computation technique to reduce the number of restricting conditions and to accelerate the computational speed in the semidefinite programming method and the convex quadratic programming method.

4. The turbulence avoidance operation assist device according to claim 2, wherein constraints condition equations in an IF-THEN syntax are formulated to be used as a computation technique to reduce the number of restricting conditions and to accelerate the computational speed in the semidefinite programming method.

5. The turbulence avoidance operation assist device according to claim 1, wherein
the rectangular solids of the danger region are classified into three groups according to an intensity of turbulence, a function is provided to report a danger region not as being an avoidance object when the flight trajectory is an assembly only of weak turbulent regions, and to generate and report an avoidance trajectory based on usual steering with a bank angle of equal to or less than 30 degrees when a moderate turbulent region is included, and moreover to generate and report an avoidance trajectory based on emergency steering with a bank angle of equal to or less than 60 degrees when a severe turbulent region is included.

6. The turbulence avoidance operation assist device according to claim 2, wherein the rectangular solids of the danger region are classified into three groups according to an intensity of turbulence, and
a function is provided to report a danger region is reported not as being an avoidance object when the flight trajectory is an assembly only of weak turbulent regions, and to generate and report an avoidance trajectory based on usual steering with a bank angle of equal to or less than 30 degrees when a moderate turbulent region is included, and moreover to generate and report an avoidance trajectory based on emergency steering with a bank angle of equal to or less than 60 degrees when a severe turbulent region is included.

7. The turbulence avoidance operation assist device according to claim 3, wherein the rectangular solids of the danger region are classified into three groups according to the intensity of turbulence, and
a function is provided to report a danger region not as being an avoidance object when the flight trajectory is an assembly only of weak turbulent regions, and to generate and report an avoidance trajectory based on usual steering with a hank angle of equal to or less than 30 degrees when a moderate turbulent region is included, and moreover to generate and report an avoidance trajectory based on emergency steering with a bank angle of equal to or less than 60 degrees when a severe turbulent region is included.

8. The turbulence avoidance operation assist device according to claim 4, wherein the rectangular solids of the danger region are classified into three groups according to the intensity of turbulence, and a function is provided to report a danger region not as being an avoidance object when the flight trajectory is an assembly only of weak turbulent regions, and to generate and report an avoidance trajectory based on usual steering with a bank angle of equal to or less than 30 degrees when a moderate turbulent region is included, and moreover to generate and report an avoidance trajectory based on emergency steering with a bank angle of equal to or less than 60 degrees when a severe turbulent region is included.

* * * * *